Figures 4, 5:
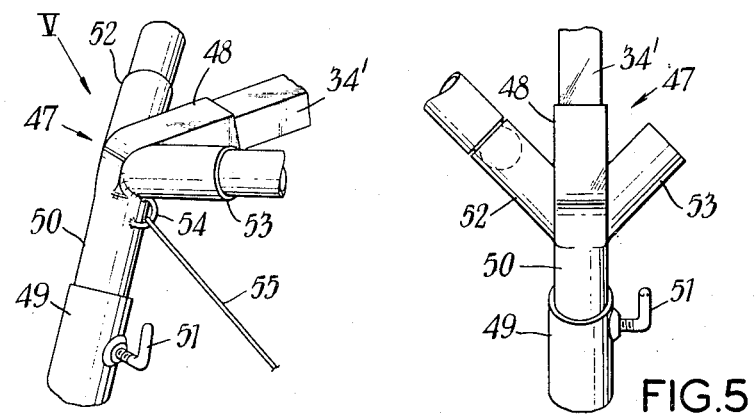

March 9, 1965    I. R. POLLARD    3,172,418
TENT AND FRAME DEVICE INCORPORATING A VEHICLE LUGGAGE RACK
Filed April 3, 1962    5 Sheets-Sheet 1
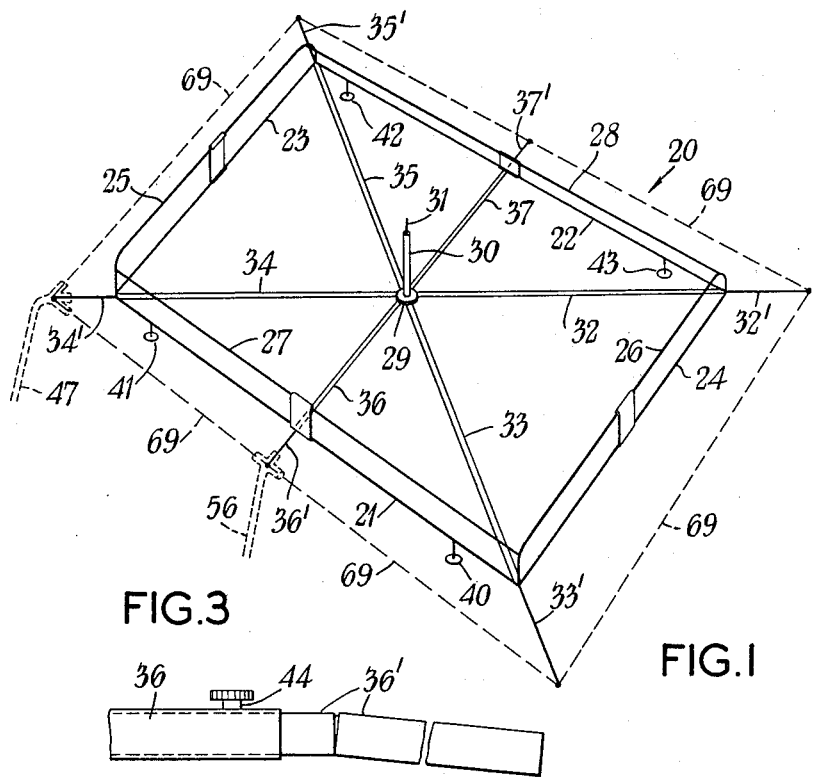
FIG.1
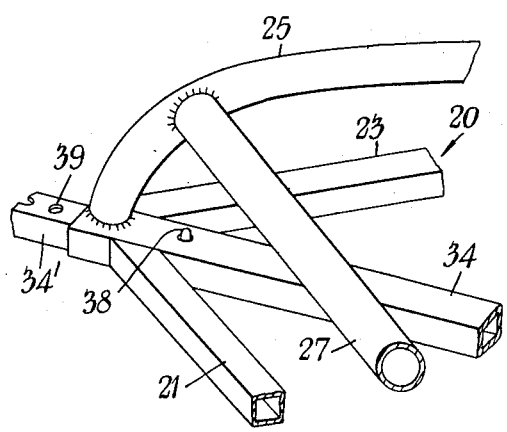
FIG.3
FIG.2

March 9, 1965     I. R. POLLARD     3,172,418
TENT AND FRAME DEVICE INCORPORATING A VEHICLE LUGGAGE RACK
Filed April 3, 1962     5 Sheets-Sheet 3

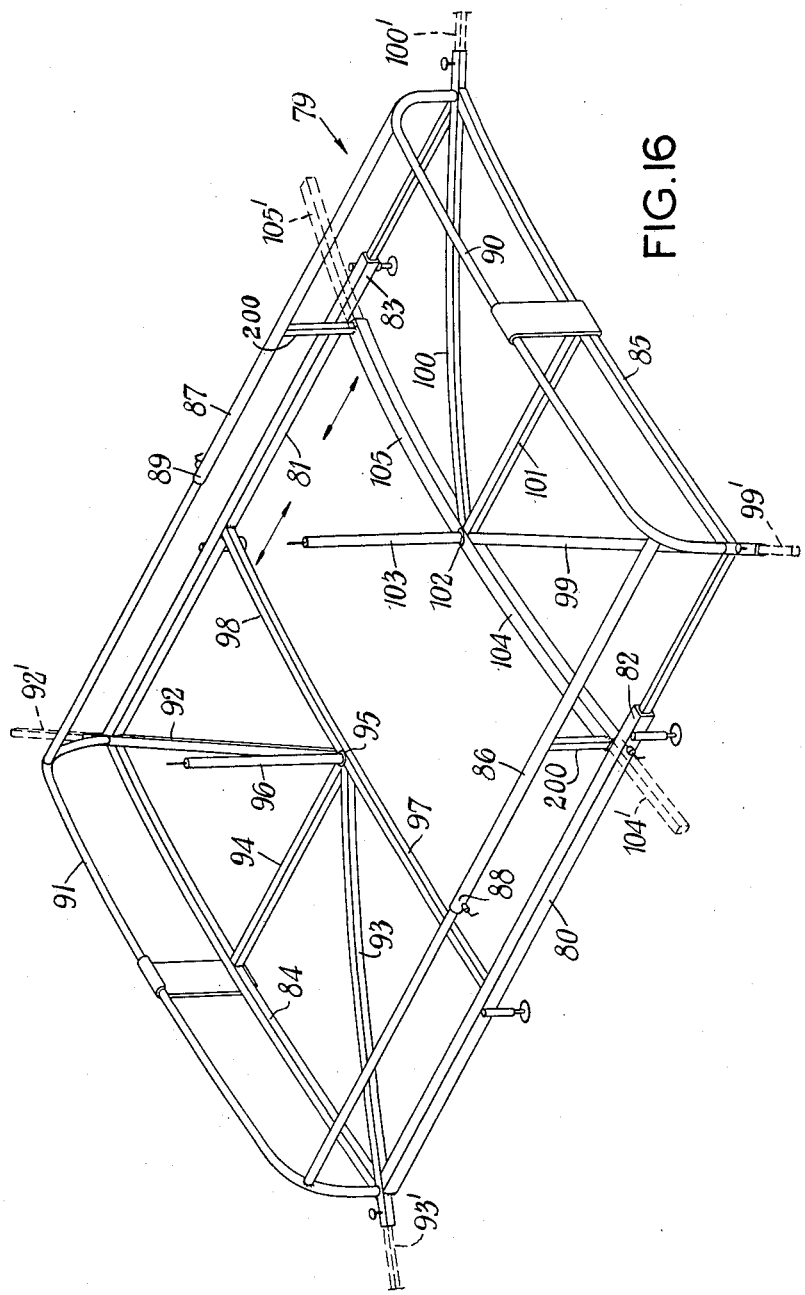

March 9, 1965   I. R. POLLARD   3,172,418
TENT AND FRAME DEVICE INCORPORATING A VEHICLE LUGGAGE RACK
Filed April 3, 1962   5 Sheets-Sheet 5

United States Patent Office 3,172,418
Patented Mar. 9, 1965

3,172,418
TENT AND FRAME DEVICE INCORPORATING A VEHICLE LUGGAGE RACK
Ivor Roger Pollard, 42 St. Johns Wood Court, London NW. 8, England
Filed Apr. 3, 1962, Ser. No. 184,769
Claims priority, application Great Britain, Apr. 10, 1961, 12,830/61
2 Claims. (Cl. 135—1)

The present invention relates to an improved tent a portion of the framework of which may be constituted as a luggage rack for a car or like vehicle, and to the said portion of the framework.

An object of the present invention is to provide a device which may be used as a vehicle luggage rack, or as the roof frame of a tent which is supported by legs or other support means to which the roof frame may readily be secured.

It is a further object of the present invention to provide a framework, incorporating a luggage rack, which is self-supporting, so that on erection the rack may be detached from the vehicle and thereafter the vehicle may be moved and used independently of the tent, no portion of the interior of the tent being occupied by the vehicle.

It is a further object of the present invention to provide a tent structure which may be erected and dismantled rapidly and without difficulty.

Yet another object is to provide a tent structure which will be both stronger and more roomy than conventional tents of comparable size, and which will be free from interior obstructions such as the supporting poles usually found in tents.

It is yet another object of the present invention to provide a tent structure which dispenses with the necessity for guy-ropes.

Another object of the invention is to provide in combination, a luggage rack, a tent roof frame and extendable legs such that the luggage rack, which can be removably mounted on the roof of a motor vehicle and can be converted thereon to form the tent roof frame and thereafter can be supported on the legs and detached from the vehicle, the luggage rack comprising a shallow framework the boundary of which is substantially rectangular in plan, means for removably connecting said framework to the roof of a motor vehicle, said framework comprising tubular construction members extending diagonally from the four corners of said boundary, arms housed one within each of said tubular members and telescopically withdrawable to an extended position so as to extend the said tubular members inflexibly in the direction of their own length to points defining four corners of the tent roof frame, means for locking said arms in their extended position, extendable members adapted to interconnect said points so as to form the boundary of said tent roof frame, the latter boundary being at all points spaced from the normal boundary of the said rack, the said extendable legs being adapted to connect with said arms so as to support said tent roof frame from ground level.

Another object is to provide the combination above described wherein the said tubular members extend from the said four corners of said luggage rack boundary to a central boss, and comprising a peg and means for mounting the peg in an upstanding position on the boss to form the apex of a tent roof.

In a further modification the longitudinal members of the roof frame are telescopic, so that the frame as a whole may be expanded and contracted longitudinally.

Figures 6, 7:
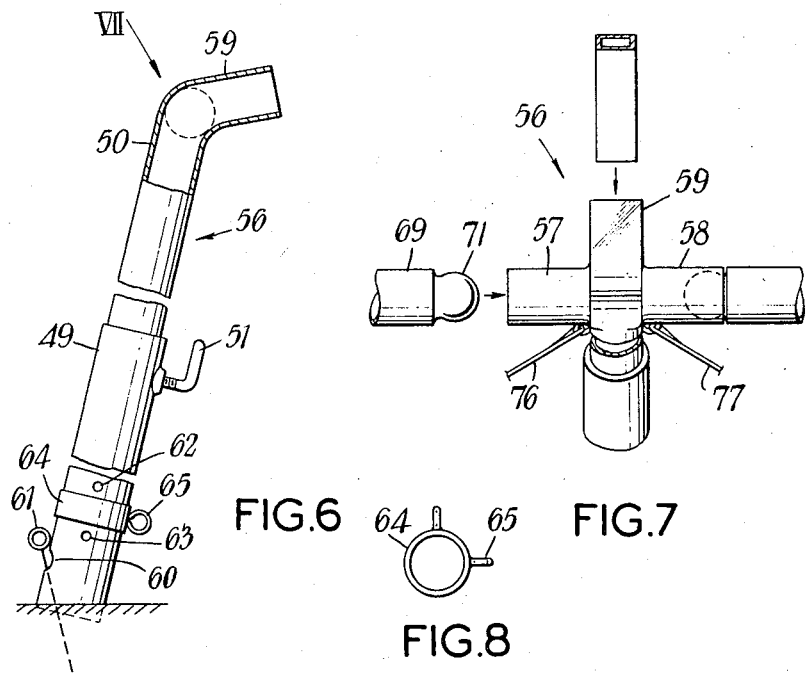
Figure 8:
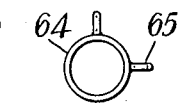
Figure 9:
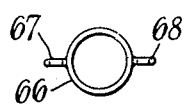
Figure 10:
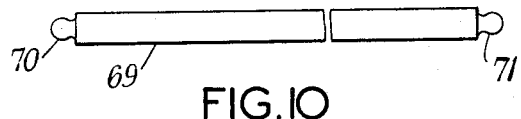
Figure 12:
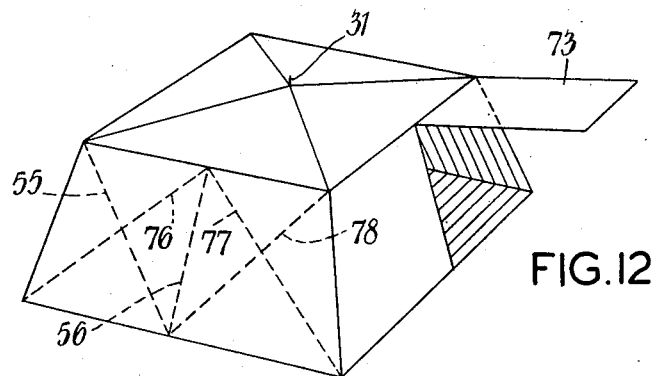
Figure 13:
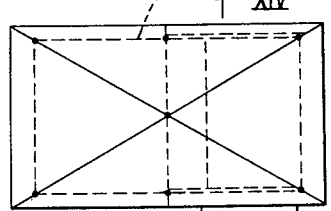
Figure 14:
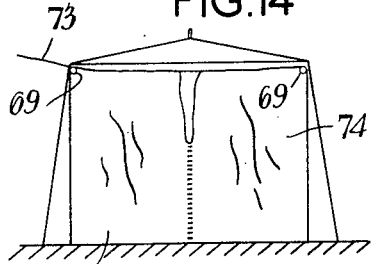
Figure 15:
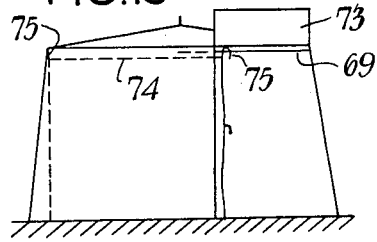
Figure 11:
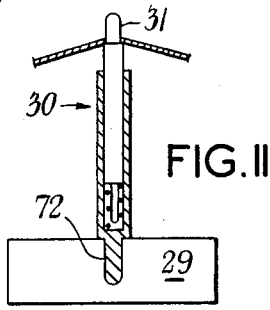
Figure 17:
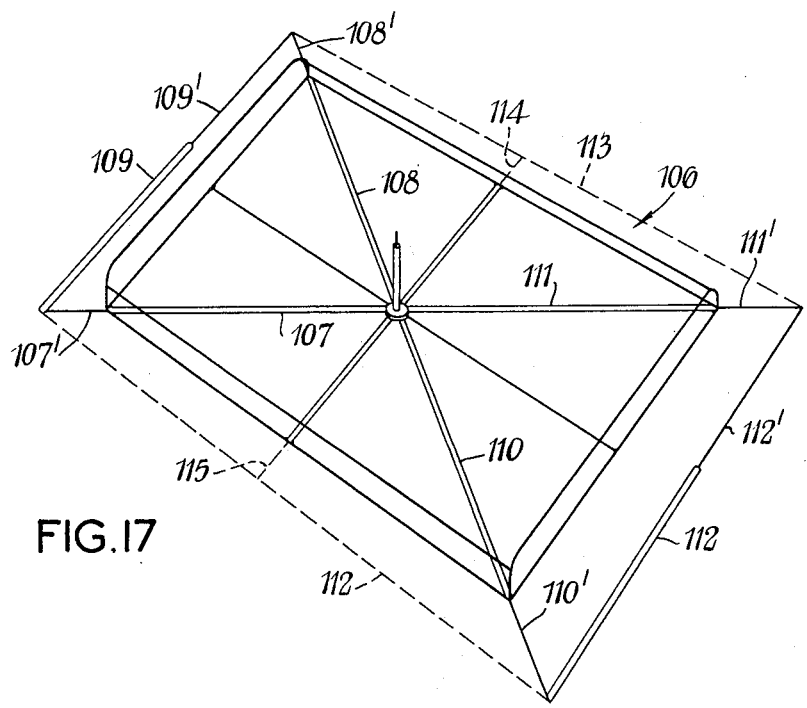

Preferred embodiments of the present invention will now be described with reference to the accompanying drawings, in which:

FIGURE 1 is a perspective view of a luggage rack which can also be used as a roof frame for a tent, FIGURE 2 is a perspective view of one corner of the frame, FIGURE 3 is a side view of a telescopic member forming part of the frame, FIGURE 4 is a perspective view of a leg which can be fitted to a corner of the roof frame, FIGURE 5 is a view in the direction V of FIGURE 4, FIGURE 6 is an elevation, partly in section, of another leg, FIGURE 7 is a view in the direction VII of FIGURE 6, FIGURES 8 and 9 are plan views of two rings used on the legs of FIGURES 4 and 7 respectively, FIGURE 10 is an elevation of a brace used in the tent, FIGURE 11 is a sectional elevational view of a pillar forming part of the roof frame of FIGURE 1, FIGURE 12 is a perspective view of the tent of which the roof frame of FIGURE 1 forms a part, FIGURE 13 is a plan view of the tent of FIGURE 12, FIGURE 14 is an elevation on the line XIV—XIV of FIGURE 13, FIGURE 15 is a side view of the tent, FIGURES 16 and 17 are perspective views of two further roof frames.

The roof frame 20 illustrated in FIGURES 1 and 2 constitutes a luggage rack for a car. It is of conventional rectangular shape in plan view, its periphery being defined by two lower, rigid, longitudinal members 21 and 22 and two lower, rigid, transverse members 23 and 24. These members may be all slightly arched upwardly, the longer longitudinal members 21 and 22 having a greater radius of curvatures than the shorter transverse members 23 and 24, so that the framework as a whole will conform to the slightly domed roof of a vehicle. Upstanding from the transverse members 23 and 24 are arched upper frame members 25 and 26 respectively, joined by longitudinal upper frame members 27 and 28 which are disposed parallel with, and preferably slightly inwardly of, the lower longitudinal frame members 21 and 22. These supports together form four walls of the rack which serve to contain luggage placed in it, and to which securing straps may be attached, if necessary.

Approximately at the centre of the roof frame 20 is disposed a boss 29 carrying an upstanding pillar 30 which in turn carries a peg 31 intended to support the apex of a tent in a manner to be described hereafter. Diagonal extendible members in the form of hollow arms 32, 33, 34 and 35 radiate from the boss 29 to the four corners of the lower frame members of the rack 20, and transverse hollow arms 36 and 37 extend transversely from the boss 29 to the centres of the longitudinal members 21 and 22 respectively. These six hollow arms 32 to 37 house telescopic extensions 32' to 37' respectively, each extension being fully retractable into its associated arm, so as to be within the periphery of the rack 20, and being spring-urged by means of a spring inside the arm to extend fully out of the arm so as to project beyond the periphery of the rack into the positions shown in FIGURE 1.

The extension permitted in practice would normally be somewhat greater than that illustrated. Means are preferably provided to prevent the extensions from coming fully out of their associated arms, and each extension, such as 34' (see FIGURE 2) is locked in its fully retracted or fully extended position, or in a chosen intermediate position by means of a locking pin such as 38 which projects through a bore in the arm 34 to engage in a suitably positioned bore such as 39 in the extension 34'. The pin 38 is preferably spring-urged into its locking position.

The arms 32 and 37 and the respective extensions 32' to 37' are all of square or rectangular cross section to prevent their relative rotation. The lower members 21 to 24 of the rack 20 are also of square section, but the upper members 25 and 26 are of circular section.

The rack 20 is secured to the roof of a car or like vehicle by means of feet bearing suction cups (shown at 40 to 43 respectively in FIGURE 1) or by means of clips engaging the weather channels above the windows of the vehicle, or by both of these means, in the usual way.

If the longitudinal members 21 and 22 are curved, then the outer ends of the arms 36 and 37 will be at a slightly higher level than the outer ends of the arms 32 to 35. To prevent this resulting in the free ends of the extensions being located at differing heights from the ground when fully extended from the arms, and to ensure that the free ends all lie approximately in a horizontal plane when the extensions are in their fully extended positions, the extensions 36' and 37' may be fractured or jointed, as illustrated in FIGURE 3, so that they may drop slightly and through a small angle when extended from the arms 36 or 37 until their free ends lie in the same plane as the free ends of the other extensions such as 32'.

As shown in FIGURE 3 an extension such as 36' may be fixed at any position with respect to the hollow arm 36 housing it, with the aid of a grub screw 44.

The free end of each extension 32' to 37' is adapted to socket into the hollow upper end of a leg. If the leg is intended for use at a corner of the frame, then it is of the kind shown in FIGURES 4 and 5, whereas if it is intended for use half way along a longitudinal member, then it is of the kind shown in FIGURES 6 and 7.

Each leg is preferably of telescopic construction for convenience of stowage and the telescopic parts may be spring-loaded to tend to assume a fully extended state on release of a locking member which may also serve to lock the parts in any position intermediate the fully extended and fully retracted positions, so that the height of the leg is adjustable.

Referring now to FIGURES 4 and 5, a leg used at a corner of the frame is indicated generally at 47.

The whole of the leg except its upper central portion 48 is of circular tube. A lower tube 49 receives an upper tube 50 telescopically, adjustment of the overall length of the leg being achieved with the aid of a grub screw 51. The head of the inner tube 50 is divided into three sockets 48, 52 and 53. The outer sockets are circular in section and their centre-lines (in plan view) are at right-angles.

The centre socket 48 receives as a push-fit, the outer end of the extension 34' (FIGURES 1 and 2). Underneath each outer socket is an eyelet, such as that shown at 54 in FIGURE 4, to receive the end of a cord 55, the purpose of which will be described later. Adjacent the three sockets the inner leg member 50 is bent so that the leg extends from the bend to the ground almost, but not quite, perpendicularly. The legs are thus slightly splayed so that the resultant roof frame is narrower at the level of the bends than at ground level, to give a high degree of stability.

The legs used halfway along the longitudinal frame members are shown at 56 in FIGURES 6 and 7 and are each similar to the leg 47 of FIGURES 4 and 5 except that the two outer sockets 57 and 58 have their centre-lines co-linear, while the centre sockets 59 is at right angles to the outer sockets.

A hole 60 is provided near the bottom end of each leg through which a peg 61 may be inserted and driven into the ground to anchor the leg.

Immediately above the hole the lower leg member 49 is formed with a pair of raised pips 62 and 63 which serve to keep in position a loose ring 64 carrying a pair of eyelets (one of which is shown at 65) and which are arranged in perpendicular planes.

The ring 64 used on the corner legs is shown in plan view in FIGURE 8 with the eyelets set at 90° whilst the type of ring used on the other legs is shown in FIGURE 9, at 66, having two eyelets 67 and 68 lying in a common plane.

In FIGURE 10 is shown a brace in the form of a tube 69 having integral ball-heads 70 and 71 at its ends respectively. Such a brace is fitted between each pair of adjacent legs (as shown in broken lines in FIGURE 1). The left-hand ball 70 may fit into a socket such as 53 (FIGURES 4 and 5) and the right-hand ball 71 into a socket such as 57 (FIGURE 7).

When it is desired to construct the tent the extensions 32' to 37' are fully extended from their associated arms and locked by the pins 38. Legs 47 and 56 are now fully extended and their upper ends fitted to the free ends of the appropriate extensions 32' to 37', the lower ends of the legs resting upon the ground.

The luggage rack 20 is in this way supported by the legs, three on each side of the vehicle, and may be released from the vehicle roof. The vehicle is now driven out from under the rack 20 leaving behind it a self-supporting tent framework.

Details of the central pillar 30 are shown in FIGURE 11. The pillar is formed with a stud 72 which fits into a recess in the boss 29, whilst its upper end terminates in the pin 31 which is inserted through a hole in the tent fabric to support the centre of the tent. The pillar may consist of two telescopic parts, as shown, spring-loaded to tend to assume a fully extended position.

The framework is now covered by a tent fabric, the resultant tent being illustrated in FIGURES 12, 13, 14 and 15. It will be seen that it has four nearly vertical walls, and a roof in the form of a shallow pyramid. One of the side walls of the tent is interrupted by a door flap 73 intermediate two adjacent legs of the framework.

The interior of the tent may be partitioned to form two "rooms" of adjustable area with the aid of a rectangular inner tent 74 provided with hooks 75 at its four upper corners.

The inner tent 74 is hung in the interior of the tent by attaching two of its hooks 75 to eyelets such as those shown at 54 in FIGURE 4 and passing another two hooks over the braces 69. As illustrated, three of the walls of the inner tent 74 approximately conform to the walls of the outer tent, whilst the fourth wall of the inner one spans the interior of the outer tent from one side wall to the other thereof thus dividing the interior of the tent into two "rooms." As shown in FIGURE 14 the said fourth wall of the inner tent 74 may be in two parts joined by a zip fastener or buttons, tapes or the like, to permit passage from one "room" of the tent to the other.

The size of the room defined by the inner enclosure 71 may be varied by sliding the hooks 75 toward or away from the end wall of the outer tent adjacent the opening.

The rigidity and stability of the tent may be increased with the aid of tensioning cords, four of which are shown at 55, 76, 77 and 78 in FIGURE 12.

The cord 55 is shown also in FIGURE 4 and is fastened to the eyelet 54 at the top of leg 47 at a corner of the tent. At its lower end the cord 55 is secured in an eyelet such as 67 (FIGURE 9) at the bottom of a leg 56 disposed say half-way along the side of the tent.

The cord 76 is secured at its top end to the top of leg 56 and its lower end to the bottom of corner leg 47.

Similar cords, all diagonally arranged, are secured between each pair of adjacent legs except in the entrance.

In FIGURE 16 is illustrated another roof frame 79 having longitudinal lower frame members 80 and 81, each telescopic as at 82 or 83, lower transverse members 84 and 85, upper longitudinal members 86 and 87 made telescopic as at 88 and 89 respectively and upper transverse members 90 and 91.

Connected to the lower frame members are a pair of diagonally arranged telescopic arms 92 and 93 and a non-telescopic arm 94. Extendible out of the arms 92 and 93 are extensions 92' and 93' respectively.

The three arms 92, 93 and 94 radiate from a boss 95 carrying an upstanding pillar 96.

Also radiating from the boss to the lower longitudinal frame members 80 and 81 are a pair of transverse arms 97 and 98 which may, if desired, be telescopic.

Connected to the right-hand end of the lower frame members are a pair of diagonal telescopic arms 99 and 100 and a non-telescopic arm 101, all radiating from a boss 102 carrying a pillar 103. Also radiating from the boss 102 are a pair of transversely arranged telescopic arms 104 and 105 which, at their outer ends are connected by brackets 200 to the upper longitudinal telescopic frame members 86 and 87 respectively. The radial arms 99, 100, 104 and 105 carry telescopic extensions 99', 100', 104' and 105' respectively.

In use the longitudinal frame members 80, 81, 86 and 87 can be telescoped together and the telescopic extensions 92', 93', 99', 100', 104' and 105' can all be pushed into their housing arms, in which positions the frame is suitable for use as a luggage rack on a car.

In order to convert the rack into a roof frame for a tent, the rack is loosened from the car roof, the longitudinal members 80, 81, 86 and 87 are extended so that the pillars 96 and 103 move apart, the extension members 92', 93', 99', 100', 104', 105' are extended, and legs are attached to their outer ends, whereupon the car may be driven from under the roof, leaving the tent framework ready to receive a canvas covering.

In another embodiment illustrated in FIGURE 17 the main parts of a roof frame 106 are similar to those of FIGURE 1, but extensions 107' and 108' of diagonal telescopic members 107 and 108, are linked together by a telescopic strut 109, 109'. In a similar manner telescopic extensions 110' and 111' are linked by a telescopic strut 112, 112'.

As the extensions (say 110', 111') are pulled out, each telescopic strut (112, 112') expands into the position shown in FIGURE 17. When this has been done legs are attached to the ends of the extensions and braces are attached as at 112 and 113.

Additional extendible arms may, if desired, be used at the positions indicated, in FIGURE 17, at 114 and 115.

The legs may be hinged and foldable for stowage, instead of being telescopic.

The floor of the rack may be either solid or covered with fabric and may itself provide the roof of the tent.

What I claim is:

1. In combination, a luggage rack, a tent roof frame and extendable legs such that the luggage rack, which can be removably mounted on the roof of a motor vehicle and can be converted thereon to form the tent roof frame and thereafter can be supported on the legs and detached from the vehicle, the luggage rack comprising a shallow framework the boundary of which is substantially rectangular in plan, means for removably connecting said framework to the roof of a motor vehicle, said framework comprising tubular construction members extending diagonally from the four corners of said boundary to points within said boundary, arms housed one within each of said tubular members and telescopically withdrawable to an extended position so as to extend the said tubular members inflexibly in the direction of their own length defining four corners of the tent roof frame, means for locking said arms in their extended position, braces adapted to interconnect said four corners so as to form the boundary of said tent roof frame, the latter boundary being at all points spaced from the normal boundary of the said rack, and extendable legs adapted to connect with said arms so as to support said tent roof frame from ground level.

2. The combination according to claim 1, wherein the said tubular members extend from the said four corners of said luggage rack boundary to a central boss, a peg and means for mounting the peg in an upstanding position on the boss to form the apex of a tent roof.

References Cited in the file of this patent

UNITED STATES PATENTS

| 2,641,396 | Parr | June 9, 1953 |
| 2,663,472 | Belgau | Dec. 22, 1953 |
| 2,870,774 | Blosser | Jan. 27, 1959 |
| 2,928,403 | Hoskins | Mar. 15, 1960 |
| 3,040,756 | Zerbe | June 26, 1962 |
| 3,055,380 | Benka et al. | Sept. 25, 1962 |
| 3,084,703 | Lefebvre et al. | Apr. 9, 1963 |
| 3,088,475 | Muhr | May 7, 1963 |

FOREIGN PATENTS

| 1,176,679 | France | Nov. 24, 1958 |
| 220,998 | Australia | Apr. 10, 1959 |